United States Patent Office 3,227,637
Patented Jan. 4, 1966

3,227,637
METHOD OF BONDING COATINGS
Harold George De Hart, 156 Notch Road, Clifton, N.J.
No Drawing. Filed June 3, 1965, Ser. No. 461,187
2 Claims. (Cl. 204—38)

This application is a continuation-in-part of application Serial No. 185,199, filed April 5, 1962, now abandoned.

The present invention deals with a method of bonding coatings and more particularly with a method of bonding coating materials to metal surfaces.

Thermoplastic and thermosetting resin coatings contemplated in accordance with this invention are provided on metal surfaces, e.g., by fusing such coating materials onto the metal surfaces in various manners. The coating material may be applied to a metal surface as a sheet material and the sheet material being bonded to the metal surface by heat treatment. The coating material may be applied to a metal surface as an aqueous or solvent dispersion of particles and transformed thereon by fusion into a coherent fused layer after evaporation of the liquid vehicle, or the coating may be applied by dipping a heated metal into a loosely settled bed of thermoplastic powder, or by contacting the heated metal with a bed of powder in a state of aeration intermediate that of a fluidized bed and the loosely settled powder, or by spraying the heated metal with thermoplastic powder.

Certain thermoplastic materials herein contemplated, such, e.g., as chlorinated polyethers and fluorocarbon resins, especially polytrifluorochloroethylene, are either reluctant to bond satisfactorily with certain metals, or they readily lose their bond when employed under certain conditions, e.g., as the result of the action of water. The method of the present invention permits such coatings to be very strongly bonded to metals and permits these materials to resist any loss of bond strength even under the action of boiling water for prolonged periods.

The use of other coating materials such as glasses, paints, lacquers, rubber, asphalts, enamels, porcelain, and even metals are also herein contemplated and are advantageously bonded to base members in accordance with the method of this invention.

It is an object of the invention to provide a method of bonding protective coating to metals which will result in a strong bond of the coating to the metal base.

It is another object of the invention to provide a method of bonding thermoplastic materials to metals by treating the metal surface with a strong bond producing electroplated metal layer and subsequently fusing a coating of thermoplastic material to the treated surface.

It is a further object of the invention to provide a method of bonding fusible materials to metal surfaces electroplated with a thin layer of metal under high voltage and high current density electroplating conditions.

Other objects and advantages of the invention will become apparent from the descriptioin hereinafter following.

The method according to the invention concerns the pretreating of material to be coated, e.g., metals such as aluminum and steel, or other metals and alloys, to clean the material, and subsequently brushing an electrolyte with an anode brush over the material as a cathode thereby electroplating the cleaned metals with a thin metal film in the particular manner of the present invention, and thereafter bonding the coating material, e.g., plastic material, onto the electroplated layer. In accordance with the present invention, the electroplated layer is applied to the base metal, as the cathode, under higher voltages and higher cathode current density per square foot of the base metal than heretofore practiced by conventional plating methods. In plating the thin metal layer under the voltages and current densities herein contemplated, the thickness of the plated layer as hereinafter more particularly described is of critical significance in the provision of a high strength bond of the coating material subsequently applied to the electroplated surface.

In the bonding of resin plastics to metal surfaces the preparation of the metal surfaces to accept the plastics with a strong bond therebetween not only is the thickness of the plated layer of critical significance, but it is also of equal importance to apply the layer in a manner which will assure a good bond between the metal surface and the plated layer and also the provision of a tenacious microscopic moss-like crystal growth on the surface of the plated film. While these conditions are not critical in ordinary plating of metals, they are of an extremely important and critical nature in the combination of fusing resin coatings to such surfaces. Because of the thinness of the coating, the moss-like structures are actually anchored to the base being coated. Otherwise, if the plated layer were too thick, the moss-like surface of such plated layer would not be anchored to the base and it would be a loosely adherent surface. Therefore, by brush plating, i.e. with the base as a cathode, it is important that the deposited plated coating be actually burned onto the base by keeping the anode brush and the cathode in very closely spaced relationship.

Various manners of applying protective coatings to metal surfaces, as hereinabove recited, are employed in the coating of base materials, especially metals, by fusing or otherwise bonding the coating material onto a surface of the base material subsequent to the brush electroplating of a thin metal film onto the base metal surface under high current density and high voltage electroplating conditions. The base material plated in accordance with the invention may be a metal such as steel, aluminum, beryllium, titanium, tungsten, or alloys thereof, or various metal alloys such as brass, bronze, etc. which may be employed as an effective cathode in the plating operation, or various materials such as ceramic materials which may be capable of use as a cathode or which may be modified to be capable of such use.

In accordance with the invention, it is contemplated that the high current densities employed are in the range of from about 100 to 5000 amperes cathode current density per sq. ft. of cathode surface. Preferably, the current densities are in the range of from 200 to 2000 amperes per sq. ft., e.g., 750 amperes per sq. ft. cathode current density. The voltages contemplated are from 5 to 25 volts, e.g., 10 to 15 volts, and prefereably about 15 volts when employed in the co-depositing of metals.

The critical thickness of the plated surface in accordance with the invention ranges from one one-hundredth of a mil to about one mil, e.g., from about 0.03 mil to about 0.15 mil, more preferably about 0.1 mil.

Base materials to be coated with a protective material are pretreated for coating by various degreasing and cleaning methods, including, for example, as follows:

*Pretreatment*

A strip of steel 3" long, 1" wide, and 3/16" thick was first degreased with the organic solvent trichloroethylene by dipping the strip into the solvent and subsequently drying in air.

The strip was then cleaned by placing it into an alkaline electrolyte solution composed of water containing dissolved therein one pound per gallon of sodium hydroxide and three pounds per gallon of trisodium phosphate.

The strip was mounted in the electrolyte as an electrode with another strip of identical and degreased steel mounted therein as another electrode. Electrical current at 12 volts D.C. was impressed on the electrodes, and the current was periodically reversed every five to ten seconds. The number of reversals is a function of the condition of the surface of the strips, and in this case, six reversals were employed and terminated with the strip to be coated as an anode at the last reversal. The strip to be coated was removed from the electrolyte, rinsed in cold water, and subsequently electroplated in accordance with the invention.

While the above pretreatment indicates a particular method of degreasing and cleaning the metal strip which is to be subsequently coated, the metal strip may be, of course, cleaned by other conventional methods such as by wire brushing, sand or grit blasting, pickling, etc. which are known cleaning methods.

The degreased and cleaned base materials were prepared for coating as set forth in the following examples:

Example I

The strip to be coated was degreased and cleaned in accordance with the above Pretreatment, and a plating solution having the following composition was prepared:

Anhydrous cadmium sulphate (60 grams)
Ammonium sulphate (40 grams)
Ethylene diamine (100 cc.)

The above constituents were made up to one liter with water. A brush anode of the type conventionally employed in brush plating was electrically connected to an electrical energizing circuit and the strip to be coated was connected into the circuit as a cathode. The brush was dipped into the above indicated solution, and the solution was brushed over the cathode strip at a voltage of 10 volts and cathode current density of 750 amperes per sq. foot. The strip was so brushed until a layer of cadmium 0.1 mil thickness was electroplated on the strip. The strip was then rinsed with water and dried and heated to a temperature of 700° F. Then powdered fluorinated ethylene propylene was sprayed onto the heated cadmium surface and fused thereon. After the spraying operation, the coated strip was further heat treated above the melting point of the plastic powder to provide a smooth fused surface.

Example II

The strip to be coated was degreased and cleaned in accordance with the above Pretreatment, and a plating solution having the following composition was prepared:

Cadmium acetate (60 grams)
Ammonium sulphate (40 grams)
Ethylene diamine (100 cc.)

The above constituents were made up to one liter with water. A brush anode of the type conventionally employed in brush plating was electrically connected to an electrical energizing circuit and the strip to be coated was connected into the circuit as a cathode. The brush was dipped into the above indicated solution, and the solution was brushed over the cathode strip at a voltage of 10 volts and cathode current density of 750 amperes per sq. foot. The strip was so brushed until a layer of cadmium 0.1 mil thickness was electroplated on the strip. The strip was then rinsed with water and dried and heated to a temperature of 450° F. Then powdered chlorinated polyether was poured onto the the heated cadmium surface and fused thereon. After the pouring operation, excess powder was blown off with compressed air and the coated strip was further heat treated above the melting point of the plastic powder to provide a smooth fused surface.

Example III

The strip to be coated was degreased and cleaned in accordance with the above Pretreatment, and a plating solution having the following composition was prepared:

Cadmium sulphate (56 grams)
Cobalt sulphate (60 grams)
Ammonium sulphate (20 grams)
Ethylene diamine (100 cc.)

The above constituents were made up to one liter with water. A brush anode of the type conventionally employed in brush plating was electrically connected to an electrically energizing circuit and the strip to be coated was connected into the circuit as a cathode. The brush was dipped into the above indicated solution, and the solution was brushed over the cathode strip at a voltage of 15 volts and cathode current density of 200 amperes per sq. ft. The strip was so brushed until a layer consisting of co-deposited cadmium and cobalt 0.15 mil in thickness was electroplated on the strip. The strip was then rinsed with water and dried and heated to a temperature of 700° F. Then powdered fluorinated ethylene propylene was sprayed onto the heated cadmium surface and fused thereon. After the spraying operation, the coated strip was further heat treated above the melting point of the plastic powder to provide a smooth fused surface.

Example IV

The strip to be coated was degreased and cleaned in accordance with the above Pretreatment, and a plating solution having the following composition was prepared:

Anhydrous cadmium sulphat (60 grams)
Ammonium sulphate (40 grams)
Ethylene diamine (100 cc.)

The above constituents were made up to one liter with water. A brush anode of the type conventionally employed in brush plating was electrically connected to a D.C. electrical energizing circuit and the strip to be coated was connected into the circuit as a cathode. The brush was dipped into the above indicated solution, and the solution was brushed over the cathode strip at a voltage of 3 volts and current density of 30 amperes per sq. ft. The strip was so brushed until a layer of cadmium 1.5 mils thickness was electroplated on the strip. The strip was then rinsed with water and dried and heated to a temperature of 700° F. Then powdered fluorinated ethylene propylene was sprayed onto the heated cadmium surface and fused thereon. After the spraying operation, the coated strip was further heat treated above the melting point of the plastic powder to provide a smooth fused surface.

The above Examples I through III employed voltages and cathode current densities and electroplated layer thicknesses in accordance with the invention. The Example IV employed conventional voltage, cathode current density, and thickness of electroplated layer. Plastic coated strips according to the above examples were tested for bond strength by placing the coated strips in boiling water. After about 24 hours the strip made in accordance with Example IV exhibited a very poor bond, and the plastic was easily separated from the metal by prying with a knife blade. The coated strips according to Examples I through III were continued under the boiling water test, and after 1000 hours, it was impossible to separate the plastic layer from the metal with a knife blade.

While the above examples indicate a brush plating method for applying the electroplated layer, other plating methods are contemplated in connection with the provision of the high voltage and high current density factors. For example, the high voltage and high current density may be obtained by contacting the anode and cathole with an electrolyte therebetween, provided the anode and cathode being placed in very close proximity to each other and the anode having a surface area substantially equal to or greater than the cathodic surface being plated. Also, in lieu of the brush employed in the brush plating, the anode may be prepared as a wipe comprising an anode covered with an absorbent material for containing and applying the electrolyte.

While the above examples illustrate electrolytes containing cadmium and cadmium and cobalt compounds for the plating of cadmium and cadmium and cobalt as a co-deposited plating, there are many other electrolytes containing a variety of metal compounds which may be advantageously employed in accordance with the invention and which otherwise would not provide for adequate bonding. For example, the electrolytes may contain metal compounds for the plating of antimony, arsenic, chromium, tin, zinc, or for the co-depositing of plated layers of arsenic and copper, cadmium and nickel, copper and zinc, etc. However, it has been established that the thickness of the plated film is of critical significance in connection with the high voltage and high current density factors of the invention. It is believed that the high current densities operate to anchor the deposited metal onto the base with an extremely high tenacity, and that there is formed a microscopic extremely tenacious moss-like surface consisting of crystal growths out of the surface of the plated base. Such an extremely tenacious moss-like surface is not created by plating with lower current densities and lower voltages such as employed in conventional plating operations employing current densities of substantially less than about 100 amperes per sq. ft. and voltages less than about 5 volts. While the base metals plated in accordance with the invention can be bonded to plastics for the provision of an excellent plastic to metal bond, the same advantages are provided by the bonding of various other materials as coating materials for metals. It is believed that where conventional electroplating methods are employed to coat a base metal prior to the bonding of another metal thereto, that the plating of such a metal by the method of this invention will provide a superior bond for bonding metal to metal.

Various modifications of the invention are contemplated within the scope of the appended claims.

What is claimed is:

1. The method of bonding a resin coating to a metal base comprising passing an electrical current between an anode and a surface of the metal base as a cathode in close proximity to each other with an electrolyte therebetween, and brushing the electrolyte with the anode over the cathode surface thereby electroplating onto the surface of the base a thin metal layer from 0.1 mil to 0.15 mil thickness under voltages between 10 and 15 volts and current densities of from 200 to 750 amperes per sq. ft. of the base surface, heating the electroplated surface to a temperature above the melting point of a resin powder material, contacting the heated electroplated surface with the resin powder material and thereby fusion bonding a resin coating onto the electroplated surface.

2. The method of bonding a resin coating according to claim 1, wherein the electroplated layer consists of at least one of the metals cadmium and cobalt.

References Cited by the Examiner
UNITED STATES PATENTS

| | | |
|---|---|---|
| 2,802,897 | 8/1957 | Hurd et al. |
| 2,833,702 | 5/1958 | Elfers _____ 204—224 XR |
| 3,136,651 | 6/1964 | Spessard _____ 117—21 |

JOHN H. MACK, *Primary Examiner.*